United States Patent
Meriaz et al.

(10) Patent No.: US 9,596,566 B2
(45) Date of Patent: Mar. 14, 2017

(54) CONCEPTS FOR LOCATION-BASED CALL CONTROL

(71) Applicant: MBTE Sweden AB, Göteborg (SE)

(72) Inventors: Yoram Meriaz, Tel-Aviv (IL); Ran Meriaz, Warner Robins, GA (US); Alex Tkachman, Holon (IL)

(73) Assignee: MBTE SWEDEN AB (SE)

( * ) Notice: Subject to any disclaimer, the term of this patent is extended or adjusted under 35 U.S.C. 154(b) by 0 days.

(21) Appl. No.: 14/810,874

(22) Filed: Jul. 28, 2015

(65) Prior Publication Data

US 2016/0037297 A1    Feb. 4, 2016

Related U.S. Application Data

(60) Provisional application No. 62/031,680, filed on Jul. 31, 2014.

(51) Int. Cl.
| | |
|---|---|
| *H04W 24/00* | (2009.01) |
| *H04W 4/02* | (2009.01) |
| *H04W 4/16* | (2009.01) |
| *H04M 1/725* | (2006.01) |
| *H04W 8/26* | (2009.01) |
| *H04M 3/42* | (2006.01) |

(52) U.S. Cl.
CPC ....... *H04W 4/021* (2013.01); *H04M 1/72572* (2013.01); *H04M 3/42102* (2013.01); *H04W 4/16* (2013.01); *H04W 8/26* (2013.01); *H04M 1/72597* (2013.01); *H04M 3/42348* (2013.01)

(58) Field of Classification Search
CPC .............................. H04M 1/7253; H04L 67/02
USPC ... 455/404.1, 414.1, 456.3, 418, 407, 432.1, 455/456.1; 379/201.02, 389, 216.01, 379/202.01, 266.07
See application file for complete search history.

(56) References Cited

U.S. PATENT DOCUMENTS

| | | |
|---|---|---|
| 5,758,286 A | 5/1998 | Leppanen |
| 6,456,234 B1 | 9/2002 | Johnson |
| 6,501,948 B1 | 12/2002 | Salin |
| 7,103,151 B2 | 9/2006 | Lass et al. |
| 7,197,321 B2 | 3/2007 | Erskine et al. |
| 7,272,392 B2 | 9/2007 | Boda |
| 7,353,016 B2 | 4/2008 | Roundtree et al. |
| 7,362,698 B2 | 4/2008 | Christensen et al. |
| 7,545,760 B1 | 6/2009 | Daniel et al. |
| 7,548,915 B2 | 6/2009 | Ramer et al. |

(Continued)

FOREIGN PATENT DOCUMENTS

| | | |
|---|---|---|
| EP | 1435720 A2 | 7/2004 |
| WO | WO 2010/073237 A2 | 7/2010 |

OTHER PUBLICATIONS

International Searching Authority, International Search Report and Written Opinion for International Application No. PCT/US2015/042637, Oct. 8, 2015, 10 pages, European Patent Office, The Netherlands.

*Primary Examiner* — Kiet Doan
(74) *Attorney, Agent, or Firm* — Alston & Bird LLP

(57) ABSTRACT

Computer program products, methods, systems, apparatus, and computing entities are provided for location-based call control. In one embodiment, call control rules for an outbound call can be determined/identified based on the location of the mobile device. The call control rules direct the outbound call to different numbers and/or different applications.

18 Claims, 11 Drawing Sheets

(56) References Cited

U.S. PATENT DOCUMENTS

| | | |
|---|---|---|
| 7,710,290 B2 | 5/2010 | Johnson |
| 8,036,160 B1 | 10/2011 | Oakes, III |
| 8,238,922 B2 | 8/2012 | Parameswar |
| 8,243,724 B2 | 8/2012 | Meriaz et al. |
| 8,275,102 B2 | 9/2012 | Zheng et al. |
| 8,275,352 B2 | 9/2012 | Forstall et al. |
| 8,295,801 B2 | 10/2012 | Ray et al. |
| 8,498,290 B2 | 7/2013 | Hughston |
| 8,644,485 B1 | 2/2014 | Vendrow et al. |
| 2002/0077085 A1 | 6/2002 | Kalish et al. |
| 2004/0052346 A1 | 3/2004 | Ohta et al. |
| 2004/0185824 A1 | 9/2004 | Cheng |
| 2004/0266422 A1 | 12/2004 | Hotze et al. |
| 2008/0133580 A1 | 6/2008 | Wanless et al. |
| 2008/0205608 A1 | 8/2008 | Tal et al. |
| 2008/0261603 A1 | 10/2008 | Sever et al. |
| 2009/0046843 A1* | 2/2009 | Baciu ............... H04M 1/56 379/201.02 |
| 2009/0262733 A1* | 10/2009 | Olson ............... H04L 12/66 370/389 |
| 2011/0249666 A1 | 10/2011 | Holbrook et al. |
| 2013/0210393 A1 | 8/2013 | Hillier |

\* cited by examiner

| Key | TARGET NUMBER | ENTITY | GEOGRAPHIC AREA TYPE | GEOGRAPHIC AREA | REDIRECT TYPE | REDIRECT | URL | RULE 1 | RULE 2 |
|---|---|---|---|---|---|---|---|---|---|
| 1 | *4444 | Johnny's Pizza, Johns Creek, GA | Zip | 30092 | FaceTime | Johnny's Pizza - Peachtree Corners | | TERMINATE CALLS BETWEEN 19:00 - 07:00 EST | |
| 2 | *4444 | Elbit Systems Ltd. | Country | Israel | PSTN | 011 + 972 + 8-918-5555 | | ALWAYS ALLOW | |
| 3 | *4444 | Zip Car | latitude, longitude | ±0.001000, ±0.001000 of 33.7869128, -84.3875602 | Skype | Zip Car – Southeastern U.S. | | ALWAYS ALLOW | |
| 4 | *1212 | Delta Airlines | Region | United States and Canada | PSTN | 1-888-750-3284 | | ALWAYS ALLOW | |
| 5 | 1-888-987-4357 | Samsung | Global | Global | URL | | http://www.samsung.com/us/support/contact | TERMINATE CALLS BETWEEN 19:00 - 07:00 EST | OPEN BROWSER TO URL |
| 6 | 1-404-773-0305 | Delta Airlines | State | Georgia | URL | | http://www.delta.com/content/www/support | IF FIRST CALL, TERMINATE CALL | OPEN BROWSER TO URL |
| 7 | 1-800-823-4929 | Dish | Global | Global | URL | | https://dishnetwork.custhelp.com/app/chat | ALWAYS ALLOW | OPEN BROWSER DURING CALL TO URL |

Fig. 4

CONCEPTS FOR LOCATION-BASED CALL CONTROL

CROSS-REFERENCE TO RELATED APPLICATIONS

This application claims priority to U.S. application Ser. No. 62/031,680 filed Jul. 31, 2014, which is incorporated herein in its entirety by reference.

BACKGROUND

The number of applications resident on mobile devices has exploded giving users access to various resources almost anywhere. Because of the mobility of these devices, a need exists for location-based call control to correctly route users to the proper resources.

SUMMARY

Embodiments of the present invention provide methods, apparatuses, systems, computer program products and/or the like for the use of target numbers. A target number may be any number registered with a call control program. In various embodiments, a target number may be shortened number. In some embodiments, the target number may be associated with a particular location, area, and/or region. For example, in various embodiment, a call may be initiated via mobile device and/or the like using a target number (e.g., a shortened number and/or other target number). One or more rules related to the dialed number may be identified and the call may be completed in accordance with the identified rules. In one embodiment, at least one of the rules may depend on the geographic location of the user initiating the call. In one embodiment, the rules may indicate that, instead of completing the call as a traditional phone call, a live chat session should be established, a website should be displayed, and/or the like. In one embodiment, the rules may indicate that the call should be completed as a traditional phone call and a particular website should be displayed via a browser resident on the mobile device 105 and/or the like for providing the user with additional information or options. In one embodiment, the rules may indicate a traditional phone number to which the call should be forwarded. Various rules and rule combinations may be established for various target numbers.

In accordance with one aspect, a method is provided. In one embodiment, the method comprises (1) determining/identifying whether an outbound number of an apparatus is one of a plurality of target numbers; (2) responsive to determining/identifying that the outbound number is one of the plurality of target numbers, identifying (a) one or more call control rules associated with the outbound number and (b) a geographic area of the mobile device; and (3) responsive to identifying (a) the one or more call control rules associated with the outbound number and (b) the geographic area of the mobile device, identifying one or more actions to be carried out in accordance with the one or more call control rules based at least in part on the geographic area.

In accordance with another aspect, a computer program product is provided. The computer program product may comprise at least one computer-readable storage medium having computer-readable program code portions stored therein, the computer-readable program code portions comprising executable portions configured to (1) determine/identify whether an outbound number of an apparatus is one of a plurality of target numbers; (2) responsive to determining/identifying that the outbound number is one of the plurality of target numbers, identify (a) one or more call control rules associated with the outbound number and (b) a geographic area of the mobile device; and (3) responsive to identifying (a) the one or more call control rules associated with the outbound number and (b) the geographic area of the mobile device, identify one or more actions to be carried out in accordance with the one or more call control rules based at least in part on the geographic area.

In accordance with yet another aspect, an apparatus comprising at least one processor and at least one memory including computer program code is provided. In one embodiment, the at least one memory and the computer program code may be configured to, with the processor, cause the apparatus to (1) determine/identify whether an outbound number of an apparatus is one of a plurality of target numbers; (2) responsive to determining/identifying that the outbound number is one of the plurality of target numbers, identify (a) one or more call control rules associated with the outbound number and (b) a geographic area of the mobile device; and (3) responsive to identifying (a) the one or more call control rules associated with the outbound number and (b) the geographic area of the mobile device, identify one or more actions to be carried out in accordance with the one or more call control rules based at least in part on the geographic area.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a flowchart illustrating operations and processes that can be used in accordance with various embodiments of the present invention

DETAILED DESCRIPTION

Figure 1:
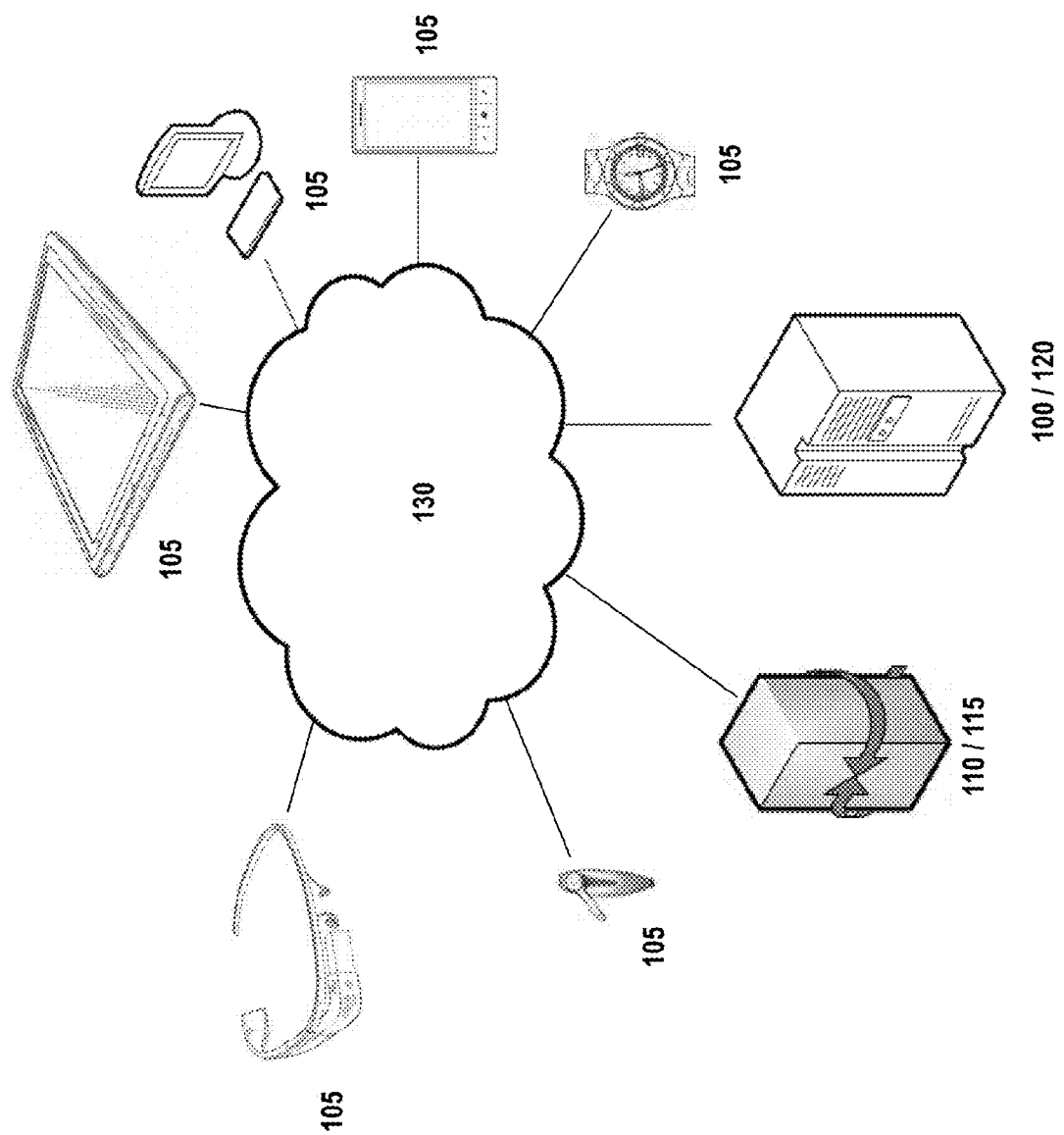
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. General Overview

Embodiments of the present invention provide methods, systems, apparatus, computer program products, and/or the like for providing a third party with control over particular phone calls. For example, a third party may register a particular number (e.g., a telephone number or shortened number) as a target number and provide one or more call control rules. For example, the call control rules may depend on the geographical location from which a call originates, the time of day at which a call originates, the calendar day on which a call originates, and the history of the mobile device 105 or other device initiating or receiving the call with the target number and/or the third party. The call control rules may indicate that, instead of completing the call via a traditional telephone network, a particular website should be displayed or a particular application should be opened on the mobile device 105 or other device initiating or receiving the call. The call control rules may provide a telephone number to which the call should be forwarded. In some embodiments, the control rules may provide a telephone number to which the call should be forwarded and indicate that a particular website or application be displayed via the mobile device 105 or other device initiating or receiving the call. It should be understood that a variety of call control rules may be implemented, as appropriate for the application. Various aspects of embodiments of the present invention will now be described.

II. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of an exemplary embodiment of the present invention. As shown in FIG. 1, this particular embodiment may include one or more call management computing entities 100, one or more mobile devices 105, one or more mobile device communications networks (comprising mobile switching centers (MSCs) 110, service control points (SCPs) 115, and/or the like), one or more third party computing entities 120, and one or more networks 130. It should be noted that any of these devices/entities can be a caller/calling device/entity (the device/entity originating the call) and/or a callee device/entity (the device/entity receiving a call). Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Call Management Computing Entity

Figure 2:
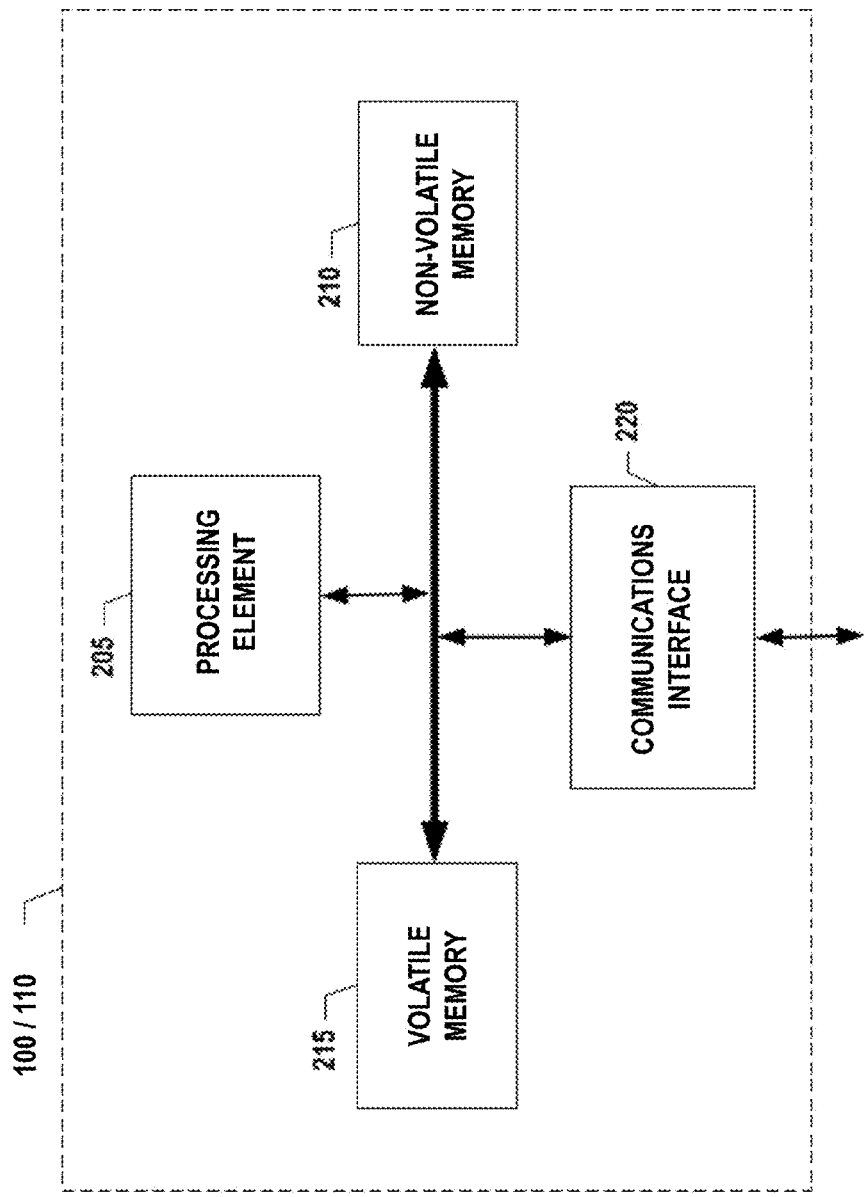
FIG. 2 is an exemplary schematic diagram of a computing entity according to one embodiment of the present invention.

FIG. 2 provides a schematic of a call management computing entity 100 according to one embodiment of the present invention. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, wearables, key fobs, radio frequency identification (RFID) tags, ear pieces, wearables, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining/identifying, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the call management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the call management computing entity 100 may include or be in communication with one or more processing elements 205 (also referred to as processors, processing circuitry, and/or similar terms used herein interchangeably) that communicate with other elements within the call management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the call management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the call management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the call management computing entity 100 with the assistance of the processing element 205 and operating system.

As indicated, in one embodiment, the call management computing entity 100 may also include one or more communications interfaces 220 for communicating with or various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the call management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via such communication protocols, the call management computing entity 100 can communicate with the mobile device 105, the third party computing entity 120, and/or various other computing entities.

Although not shown, the call management computing entity 100 may include or be in communication with one or more input elements, such as a keyboard input, a mouse input, a touch screen/display input, audio input, pointing device input, joystick input, keypad input, and/or the like. The call management computing entity 100 may also include or be in communication with one or more output elements (not shown), such as audio output, video output, screen/display output, motion output, movement output, and/or the like.

As will be appreciated, one or more of the computing entity's 100 components may be located remotely from other call management computing entity 100 components, such as in a distributed system. Furthermore, one or more of the components may be combined and additional components performing functions described herein may be included in the call management computing entity 100. Thus, the call management computing entity 100 can be adapted to accommodate a variety of needs and circumstances.

2. Exemplary Mobile Device

Figure 3:
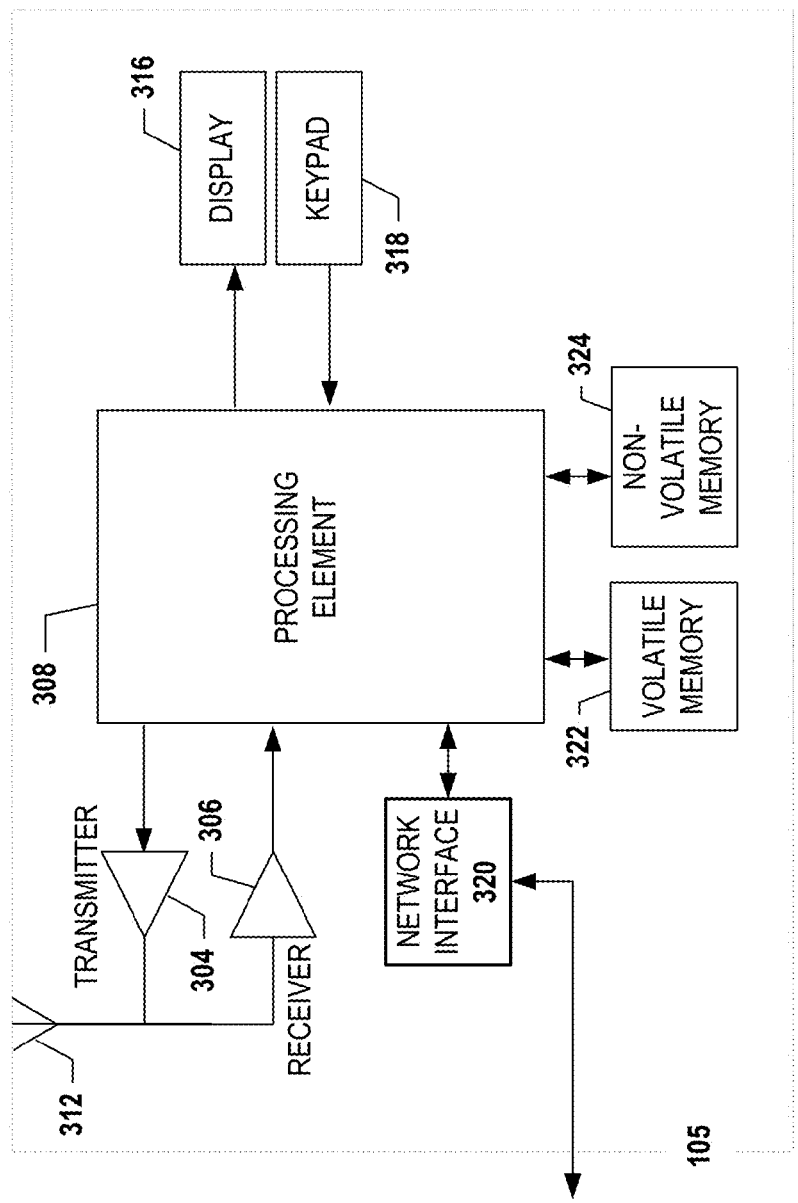
FIG. 3 is an exemplary schematic diagram of a mobile device according to one embodiment of the present invention.

FIG. 3 provides an illustrative schematic representative of a mobile device 105 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, wearables, key fobs, RFID tags, ear pieces, wearables, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the mobile device 105 can include an antenna 312, a transmitter 304 (e.g., radio), a receiver 306 (e.g., radio), and a processing element 308 (such as those described above with regard to the call management computing entity 100) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile device 105 may be capable of operating with one or more air interface standards, communication protocols, modulation types, and access types. More particularly, the mobile device 105 may operate in accordance with any of a number of wireless communication standards and protocols (e.g., via transmitter 304 and receiver 306 and/or the network interface 320), such as those described above with regard to the call management computing entity 100. In a particular embodiment, the mobile device 105 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, WiMAX, UWB, IR, Bluetooth, USB, and/or the like. Via such communication protocols, the mobile device 105 can communicate with the call management computing entity 100, the third party computing entity 120, and/or various other computing entities.

Via these communication standards and protocols, the mobile device 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile device 105 can also download changes, add-ons, and updates, for instance, to its firmware, software (e.g., including executable instructions, applications, program modules), and operating system. In one embodiment, the mobile device 105 may be executing an application initiating program that is resident on the mobile device 105. In one embodiment, the application initiating program may comprise, be associated with, or be in communication with an application initiating database. The application initiating program may also be associated with or be in communication with the call management computing entity 100 that comprises an application initiating database.

According to one embodiment, the mobile device 105 may include location determining/identifying aspects, devices, modules, functionalities, and/or similar words used herein interchangeably. For example, the mobile device 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., Global Positioning Systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined/identified by triangulating and/or estimating the mobile device's 105 position in connection with a variety of other systems, including cellular towers, Wi-Fi access points, and/or the like. For example, the location information can be determined/identified by triangulating the mobile device's 105 position in connection with a variety of other systems, including cellular towers, Wi-Fi access points, and/or the like. Further, the location information can be determined/identified from the mobile device's 105 subscriber identification module (SIM) card. For example, if a SIM card is connected to specific tower, the mobile device's 105 position is within the range of the tower. The mobile device's 105 transitions from tower to tower, signal strength, and/or the like can also be used to help determine/identify the mobile device's 105 position. Similarly, the mobile device 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The mobile device 105 may also comprise a user interface (that can include a display 316 coupled to a processing element 308) and/or a user input interface (coupled to a processing element 308). The user input interface can comprise any of a number of devices allowing the mobile device 105 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 105.

In another embodiment, the mobile device 105 may include one or more components that are functionally similar to those of the call management computing entity 100, as described in greater detail above.

3. Exemplary Mobile Device Communications Networks

In one embodiment, the mobile device communications networks may include one or more MSCs 110, SCPs 115, and/or the like for call creation, management, and termination. The MSCs 110 and SCPs 115 may include one or more components that are functionally similar to those described above with respect to the call management computing entity 100 and/or the mobile device 105. For example, in one embodiment, entities in the mobile device communications networks may each include one or more (1) processing elements, (2) memory storage areas, (3) network interfaces, (4) antennae, (5) transceivers, and/or (6) other components. In one embodiment, although not shown, the MSC 110 may be connected to one or more radio access networks (RAN), including one or more one or more base station controllers (BSC) and one or more base transceiver stations (BTS). As will be recognized, the mobile device communications networks may support a variety of network types (e.g., wired, wireless, and/or the like) and various communications standards and protocols (e.g., UMTS, CDMA2000, 1×RTT, WCDMA, TD-SCDMA, LTE, E-UTRAN, EVDO, HSPA, HSDPA, Wi-Fi, WiMAX, UWB, Customized Application of Mobile Enhanced Logic (CAMEL), Session Initiation Protocol (SIP), and/or the like).

4. Exemplary Third Party Computing Entity

A third party may be an individual, a family, a company, an organization, an entity, a department within an organization, a representative of an organization and/or person, and/or the like. In one embodiment, each third party computing entity 120 may include one or more components that are functionally similar to those of the call management computing entity 100 and/or the mobile device 105. For example, each third party computing entity 120 may include one or more processing elements, one or more display device/input devices (e.g., including user interfaces), volatile and non-volatile storage or memory, and/or one or more communications interfaces. This may enable to the third party computing entity 120 to communicate with various other computing entities, such as call management computing entities 100, mobile devices 105, and/or various other computing entities. These architectures are provided for exemplary purposes only and are not limiting to the various embodiments. The term computing entity may refer to one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions described herein.

5. Additional Exemplary Entities

Although not shown, embodiments of the present invention may include one or more origination switches, one or more Internetwork Packet Exchanges (IPXs), one or more destination switches, one or more billings systems (e.g., visited operator billing computing entities, clearinghouse billing computing entities, record processing computing entities, and home operator billing computing entities), and one or more public switch networks (PSTNs). Each of these entities may have one or more of the above-described components, such as (1) processing elements, (2) memory, (3) network interfaces, (4) transceivers, and/or (5) various other components. As will be recognized, each of these entities may support a variety of network types and various communications standards and protocols.

IV. Exemplary System Operation

As noted above, embodiments of the present invention relate to the implementation and/or use of call control rules based on geographic location. For example, embodiments of the present invention may use numbers (e.g., shortened numbers), location-based call control rules, and/or location information. In various embodiments, a call to a number may be initiated via mobile device 105 and/or the like, possibly using a shortened number. If the number is a target number, one or more rules related to the dialed number may be identified and the call may be completed in accordance with the identified rules. In one embodiment, at least one of the rules may depend on the geographic location of the user initiating the call. In one embodiment, the rules may indicate that, instead of completing the call as a traditional phone call, a live chat session should be established, a website should be displayed, and/or the like. In one embodiment, the rules may indicate a traditional phone number to which the call should be forwarded. Various rules and rule combinations may be established for various shortened numbers and/or phone numbers. Various embodiments of the present invention will now be described in more detail with reference to FIGS. 4-11.

1. Registration

In one embodiment, to take advantage of the features described herein, a third party may need to register for services with a call management computing entity 100. The services provided by the call management computing entity 100 may be provided on a free basis, a subscription basis, a pay-per-use basis, and/or the like. As will be recognized, a variety of other approaches and techniques can be used to adapt to various needs and circumstances.

As part of or after registration, the third party (e.g., operating a third party computing entity 120) may provide one or more telephone numbers (e.g., target telephone numbers) associated with the third party and for which the third party would like mobile devices 105 (e.g., executing application initiation programs) to perform certain actions before, simultaneous to, during, and/or after calling or receiving a call from such numbers. The telephone numbers (e.g., target telephone numbers) provided by the third party (e.g., operating a third party computing entity 120) may be stored by the call management computing entity 100 for use by the call management computing entity 100 (e.g., in communication with the mobile device 105), mobile devices 105 (e.g., executing application initiation programs), and/or a variety of other devices (including caller/calling devices/entities and/or callee devices/entities). Such numbers may also be stored by the mobile device 105 (e.g., executing an application initiation program) and/or a variety of other entities. For example, assume Samsung, Delta, and Dish are all registering for services with the call management computing entity 100. In this example, Samsung may provide a target telephone number of 1-888-987-4357, Delta may provide a target telephone number of 1-404-773-0305, and Dish may provide a target telephone number of 1-800-823-4929. As will be recognized, a third party is not limited to providing a single telephone number; rather, multiple telephone numbers (e.g., target telephone numbers) may be provided to the call management computing entity 100. The telephone numbers may include country codes, area codes, region codes, and/or the like.

In various embodiments, a target number may also be a shortened number (e.g., *4444). For example, the third party (e.g., operating a third party computing entity 120) may provide shortened numbers associated with the third party. The shortened numbers provided by the third party (e.g., operating a third party computing entity 120) may be stored by one or more appropriate computing entities (e.g., mobile devices 105, call management computing entities 100, and/or mobile device communications networks). For example, assume Johnny's Pizza, Elbit Systems Ltd., Delta (registering a second target number), and Zip Car are all registering for services with the call management computing entity 100. In this example, Johnny's Pizza may provide a shortened number of *4444 to be used in a specific geographic area (e.g., zip code 30092), Elbit Systems Ltd. may provide a shortened number of *4444 to be used in a specific geographic area (e.g., the country of Israel), Zip Car may provide a shortened number of *4444 to be used in a specific geographic area (e.g., ±0.001000, ±0.001000 of 33.7869128, −84.3875602), and Delta Airlines may provide a shortened number of *1212 to be used in a specific geographic area (e.g., the United States and Canada). As will be recognized, a third party is not limited to providing a single number; rather, multiple numbers (e.g., shortened numbers) may be provided to the call management computing entity 100.

In addition to the target numbers (e.g., shortened numbers and/or other target numbers), the third party (e.g., operating a third party computing entity 120) may also provide the geographic areas/locations for the target numbers and/or one or more telephone numbers, online numbers, user IDs (and applications or services), uniform resource identifiers (URIs), uniform resource locators (URLs), and/or the like (e.g., also referred to herein as call destinations) to which a call to a target number (e.g., shortened number and/or other target number) should be redirected. A geographic area/location may be one or more geofences, parking locations, highways, longitude and latitude points, zip codes, area codes, cities, counties, states, provinces, countries, a communications cell, and/or other identifiable locations. For example, for mobile devices 105 calling Johnny's Pizza's using *4444 and being associated with or being physically located in zip code 30092, Johnny's Pizza may want the calls directed to its FaceTime account (e.g., Johnny's Pizza—Peachtree Corners). Similarly, for mobile devices 105 calling Elbit Systems Ltd. using *4444 and being associated with or being physically located in Israel, Elbit Systems Ltd. may want the calls directed to their landline telephone number of 011+972+8-918-5555. For mobile devices 105 calling Zip Car using *4444 and being within ±0.001000, ±0.001000 of 33.7869128, −84.3875602, Zip Car may want calls directed to their Skype account (e.g., Zip Car—Southeastern U.S.). And for mobile devices 105 calling Delta using *1212 and being associated with or being physically located in the United States or Canada, Delta may want the calls directed to its main reservations number (e.g., 1-888-750-3284). As will be recognized, a variety of other approaches and techniques can be used to adapt to various needs and circumstances.

As indicated, the one or more call destinations may include one or more URIs or URLs to which a call to a target number (e.g., shortened number and/or other target number) should be redirected. For example, the third party (e.g., operating a third party computing entity 120) may provide one or more URIs or URLs to which users of mobile devices 105 should be directed and/or identify one or more applications that should be initiated in response to the user of a mobile device 105 (e.g., executing an application initiation program) calling the target number. For example, for mobile devices 105 calling Samsung at 1-888-987-4357 and being anywhere in the world, Samsung may want an Internet browser, user application, user interface, and/or similar words used herein interchangeably initiated, launched, opened, and/or similar words used herein interchangeably to http://www.samsung.com/us/support/contact. Similarly, for mobile devices 105 calling Delta at 1-404-773-0305 and being associated with or being physically located in the state of Georgia in the United States, Delta may want an Internet browser initiated to http://www.delta.com/content/www/support. And for mobile devices 105 calling Dish at 1-800-823-4929 and being located anywhere in the world, Dish may want a chat initiated with the user of the mobile device via, for example, a Dish application installed on the mobile device 105 or accessible via a browser at URL https://dishnetwork.custhelp.com/app/chat. As will be recognized, a third party is not limited to providing a single URL or URI; rather, multiple URIs or URLs that correspond to different rules, times, and/or the like may be provided to the call management computing entity 100. Through such interfaces, third parties can provide a variety of information, including help topics, location-based advertisements, and/or the like.

In addition to the target numbers (e.g., shortened numbers and/or other target numbers), corresponding geographic areas, and corresponding call destinations, the third party (e.g., operating a third party computing entity 120) may also define one or more call control rules for calls directed to the target numbers (e.g., shortened numbers and/or other target numbers). For example, Johnny's Pizza may define rules indicating that calls to *4444 between 19:00-07:00 Eastern Standard Time should be terminated or redirected to an Internet browser initiated on the corresponding mobile device 105 to open to http://www Johnny'sPizza.com/us/support/contact. In another example, Delta may define rules indicating that a first call to *1212 in a configurable time period will redirect to a website where the user may make a reservation and a second call to *1212 in the configurable time period will redirect to Delta's main reservations number. Or, in the case where the mobile device 105 is associated with a user account affiliated with Delta (e.g., a My Delta account), a call placed on the mobile device to *1212 within the United States or Canada may, for example, execute an application initiation program that completes a login to the user account and causes display the user account homepage via a browser or other application resident on the mobile device 105. In yet another example, the other entities may define rules indicating that calls to their corresponding target numbers should always be redirected to corresponding call destinations (e.g., telephone numbers, online numbers, user IDs (and applications or services), URLs, URIs, and/or the like).

In various embodiments, the call control rules may determine/identify whether the call destination for a particular call to a target number (e.g., a shortened number and/or other target number) is a web-based destination (e.g., a URL, URI, Internet accessible, an Internet enabled mobile app, and/or the like) or a telephone network destination (e.g., via PSTNs, Voice over Internet Protocol (VoIP), other video and/or voice communication, and/or the like). For example, the third party (e.g., operating a third party computing entity 120) may define one or more call control rules for determining/identifying whether an application should be initiated in response to the user of a mobile device 105 (e.g., executing an application initiation program) calling or receiving a call from a specified number. In another example, the third party (e.g., operating a third party computing entity 120) may define one or more call control rules for determining/identifying whether a call should be forwarded to a particular telephone number in response to the user of a mobile device 105 (e.g., executing an application initiation program) calling or receiving a call from a specified number. In yet another example, the third party (e.g., operating a third party computing entity 120) may define one or more call control rules for determining/identifying a combination of actions that should be taken (e.g., initiating an application and forwarding the call to a particular number) in response to the user of a mobile device 105 calling or receiving a call from a target number.

For example, Samsung may define rules (e.g., via a third party computing entity 120) to the call management computing entity 100 (e.g., in communication with the mobile device 105) indicating that for mobile devices 105 that call 1-888-987-4357 between 19:00-07:00 Eastern Standard Time from anywhere in the world, Samsung wants an Internet browser initiated on the corresponding mobile device 105 to open to http://www.samsung.com/us/support/contact. This may allow Samsung, for example, to route calls for technical support during non-business hours to its webpage. In another example, Delta may define rules (e.g., via a third party computing entity 120) to the call management computing entity 100 (e.g., in communication with the mobile device 105) indicating that for mobile devices 105 that call 1-404-773-0305 for the first time and are associated with or physically located in the state of Georgia in the United States, Delta wants an Internet browser initiated on the corresponding mobile device 105 to open to http://www.delta.com/content/www/support. This may allow Delta, for instance, to route first time callers to a welcome or support webpage. And in another example, Dish may define rules (e.g., via a third party computing entity 120) to the call management computing entity 100 (e.g., in communication with the mobile device 105) indicating that for mobile devices 105 that call 1-800-823-4929 from anywhere in the world, Dish wants a Dish application resident on the mobile device 105 initiated to open to a chat session for all calls or a browser initiated to open to a URL https://dishnetwork.custhelp.com/app/chat to open to a chat session for all calls (See FIG. 8). This may allow Dish to have chat sessions during or in lieu of voice calls that can be used for a variety of purposes.

As described above, a third party (e.g., operating a third party computing entity 120) may provide control rules. The control rules may be based on the geographic location of a user placing and/or receiving a call, the time of day at which the call is placed and/or received, a calendar day on which the call is placed and/or received (e.g., a particular day, date range, holiday, week day, and/or the like), the ability of a user device to complete a particular action (e.g., if the mobile device 105 has a broadband or Wi-Fi connection or not, if the mobile device 105 is connected to a telecommunications network or not, and/or the like), the mobile device's 105 history with the target number (e.g., if this is the first time the mobile device 105 has placed and/or received a call to the target number, if the mobile device 105 placed and/or received a call from the target number within a configurable time period, if the mobile device 105 is associated with a user account associated with the target number, and/or the like), and/or the like. The control rules provide a call destination (e.g., application and user ID, URL, URI, telephone number) for the particular call being placed and/or received by the mobile device. The call may then be completed as indicated by the control rules.

As will be recognized, a third party is not limited to providing a single call control rule; rather, multiple call control rules may be provided to the call management computing entity 100. Such rules may define the applications that should be initiated, e.g., a web browser, a new tab in an open web browser, an application resident on the mobile device 105 (e.g., a Johnny's Pizza, Elbit, Delta, or Zip Car application), and/or the like. The call control rules may define time frames (e.g., times of day, days of the week, holidays, and/or the like) in which the applications should be initiated or other circumstances defined by the third party. The call control rules may define when the application should be initiated, such as before, simultaneous to, during, and/or after calling or receiving a call from such numbers. The call control rules may also define whether the mobile device 105 should establish, terminate/block, or suspend calls in addition to taking or carrying out the other actions.

In one embodiment, the target numbers (e.g., shortened numbers and/or other target telephone numbers), geographical locations, call destinations (e.g., URLs, URIs, telephone numbers, and/or the like), rules, and/or the like can be stored locally in databases on mobile devices 105 (e.g., executing application initiation programs) and be controlled by a user application resident on the mobile device 105, such as is shown in FIG. 4. In such an embodiment, the call management computing entity 100 (e.g., in communication with the mobile devices 105) can update the same regularly, periodically, continuously, and/or in response to certain triggers. In another embodiment, the target numbers (e.g., shortened numbers and/or other target telephone numbers), geographical locations, call destinations (e.g., URLs, URIs, telephone numbers, and/or the like), rules, and/or the like can be stored remotely by the call management computing entity 100, the mobile device communications network (e.g., in communication with the mobile device 105), and/or or an entity or device that can receive such calls, such as is shown in FIG. 4. In this embodiment, mobile devices 105 (e.g., executing application initiation programs) may need to communicate in real time or near real time with the call management computing entity 100 and/or the mobile device communications network to determine/identify whether any actions should be taken with regard to a given phone number. As will be recognized, a variety of other approaches and techniques can be used to adapt to various needs and circumstances.

2. Number Identification and Location Determination

Figure 5:
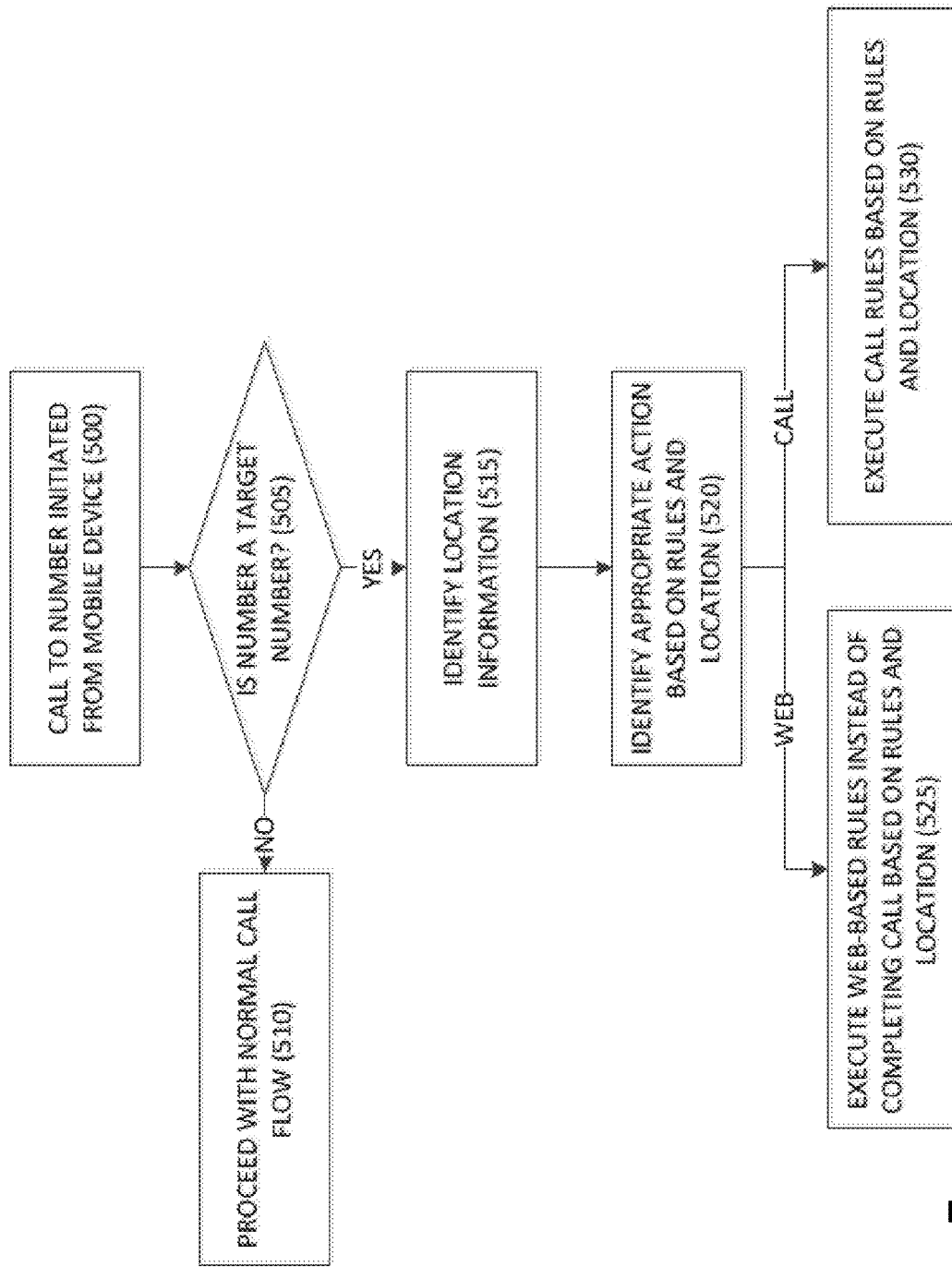
FIGS. 5-10 show exemplary input and output produced by various embodiments of the present invention.
Figure 6:
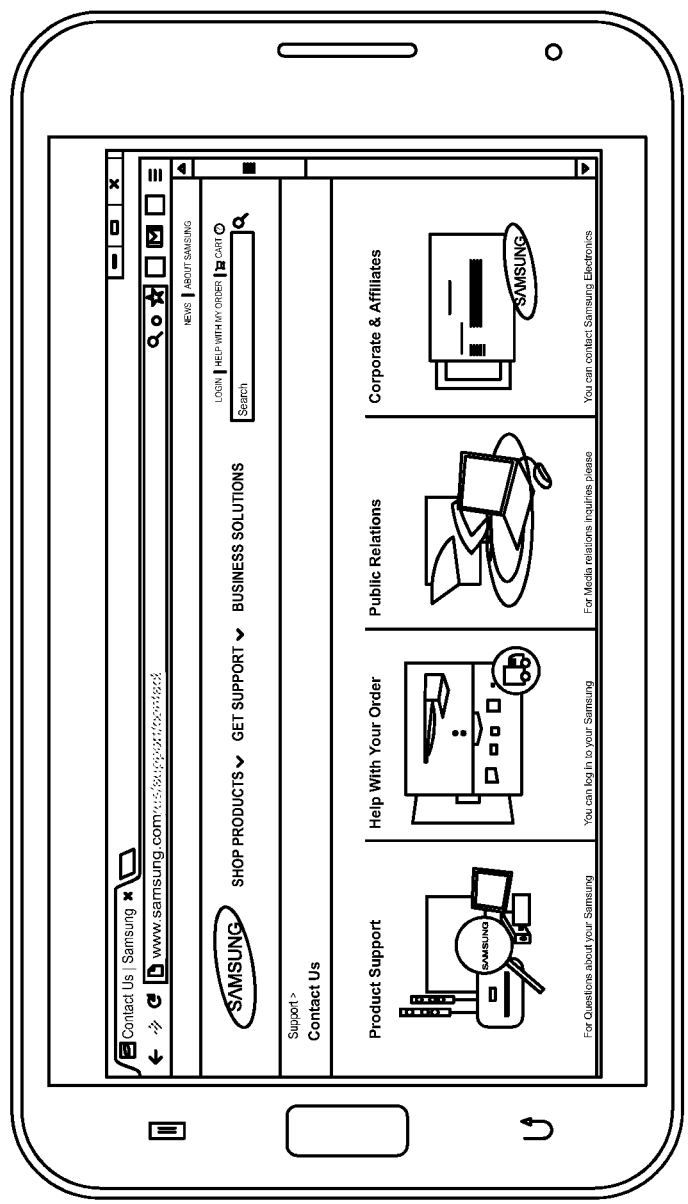
Figure 7:
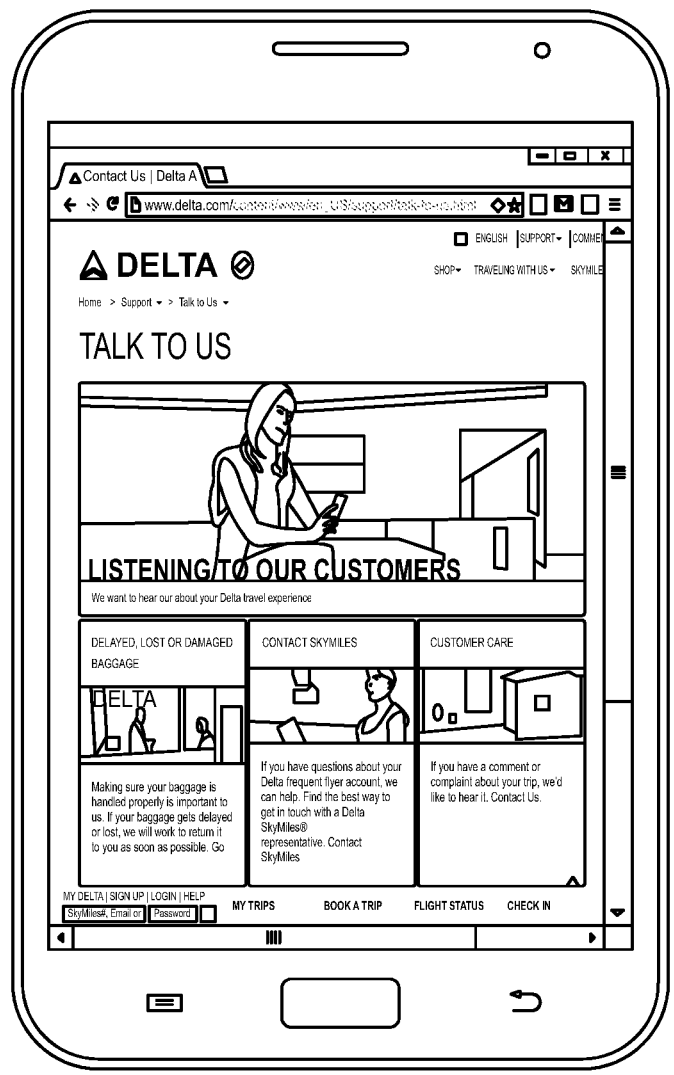
Figure 8:
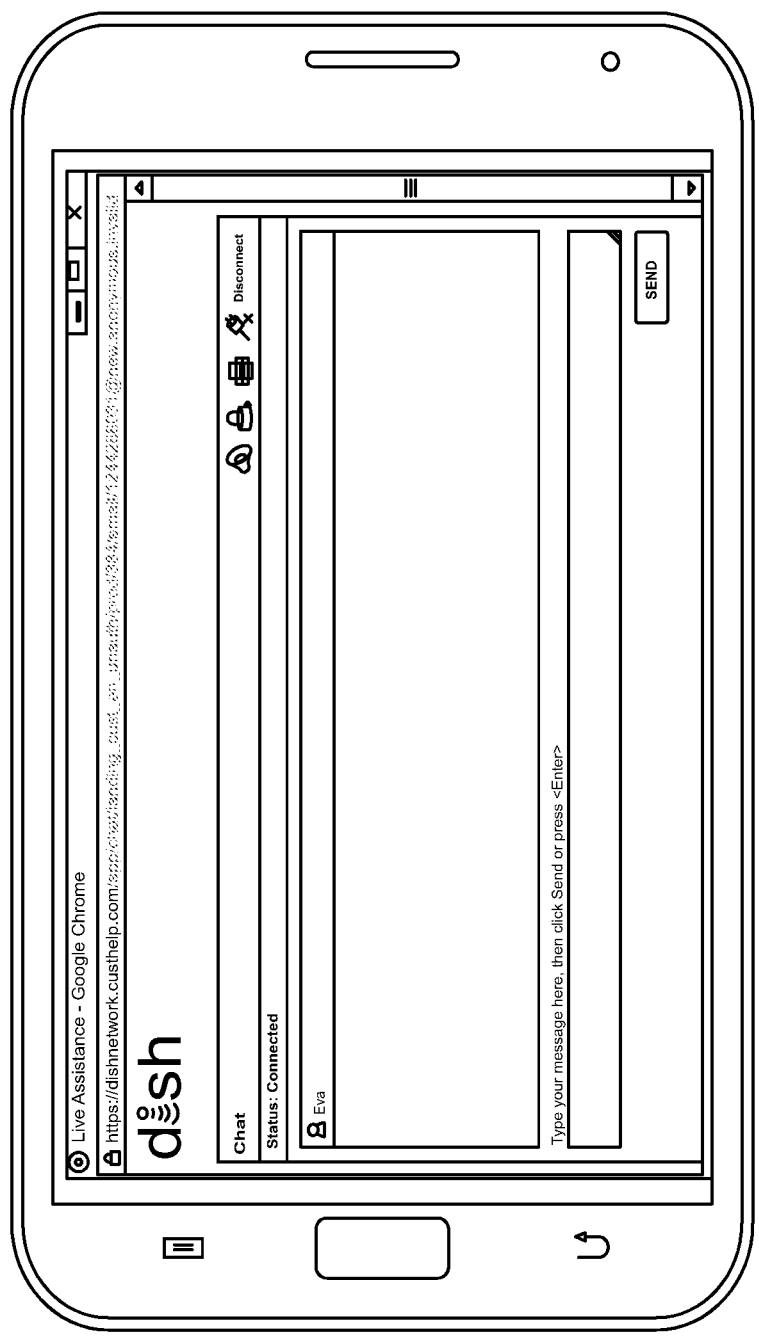
Figure 9:
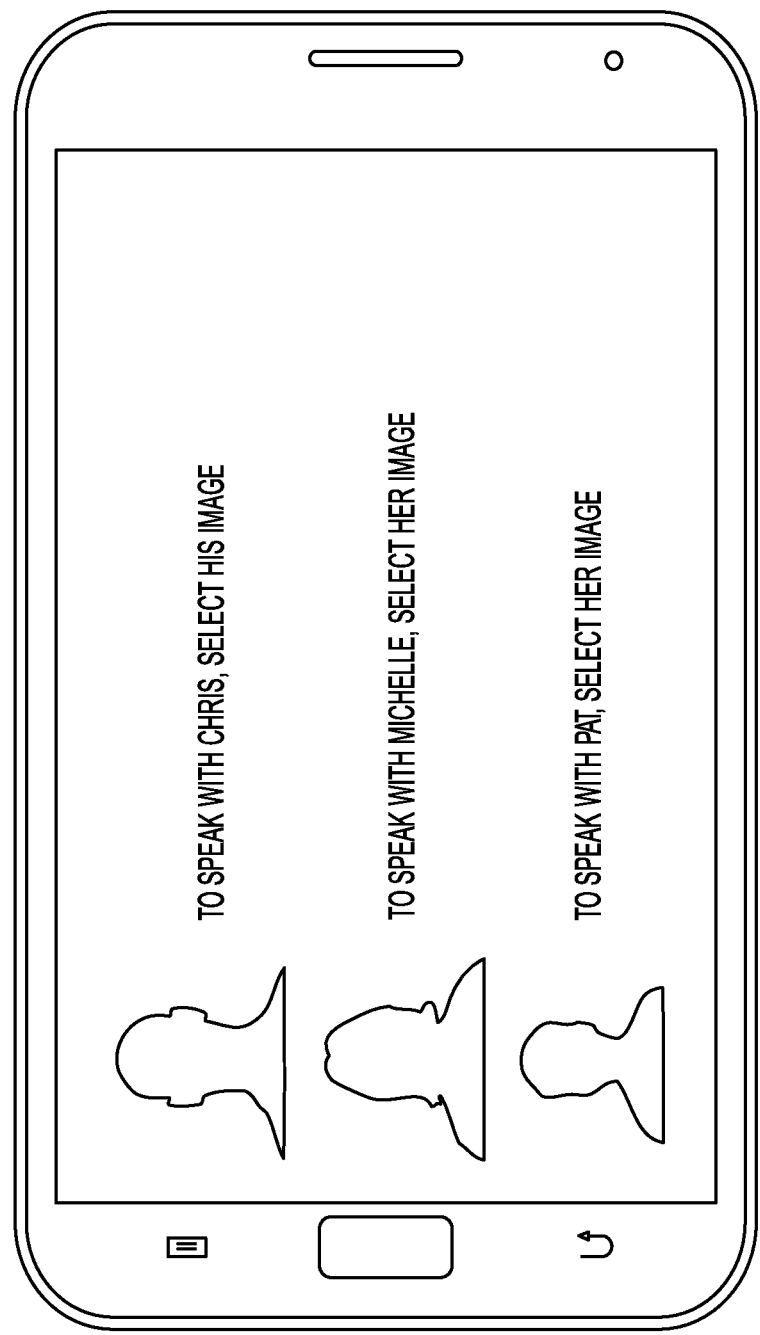
Figure 10:
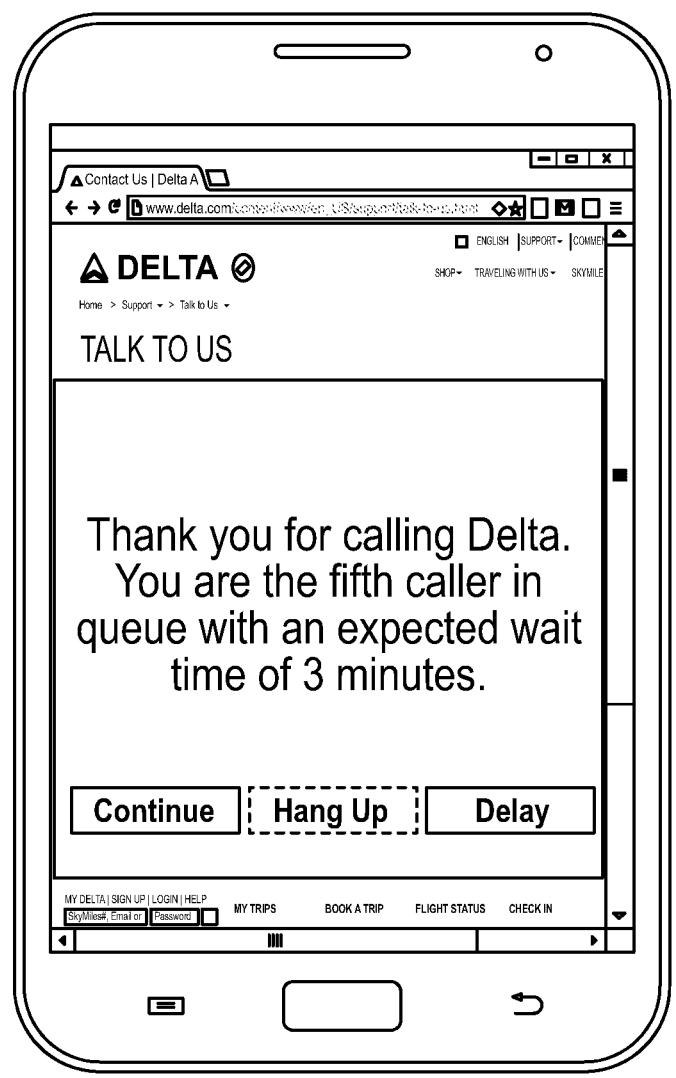
Figure 11:
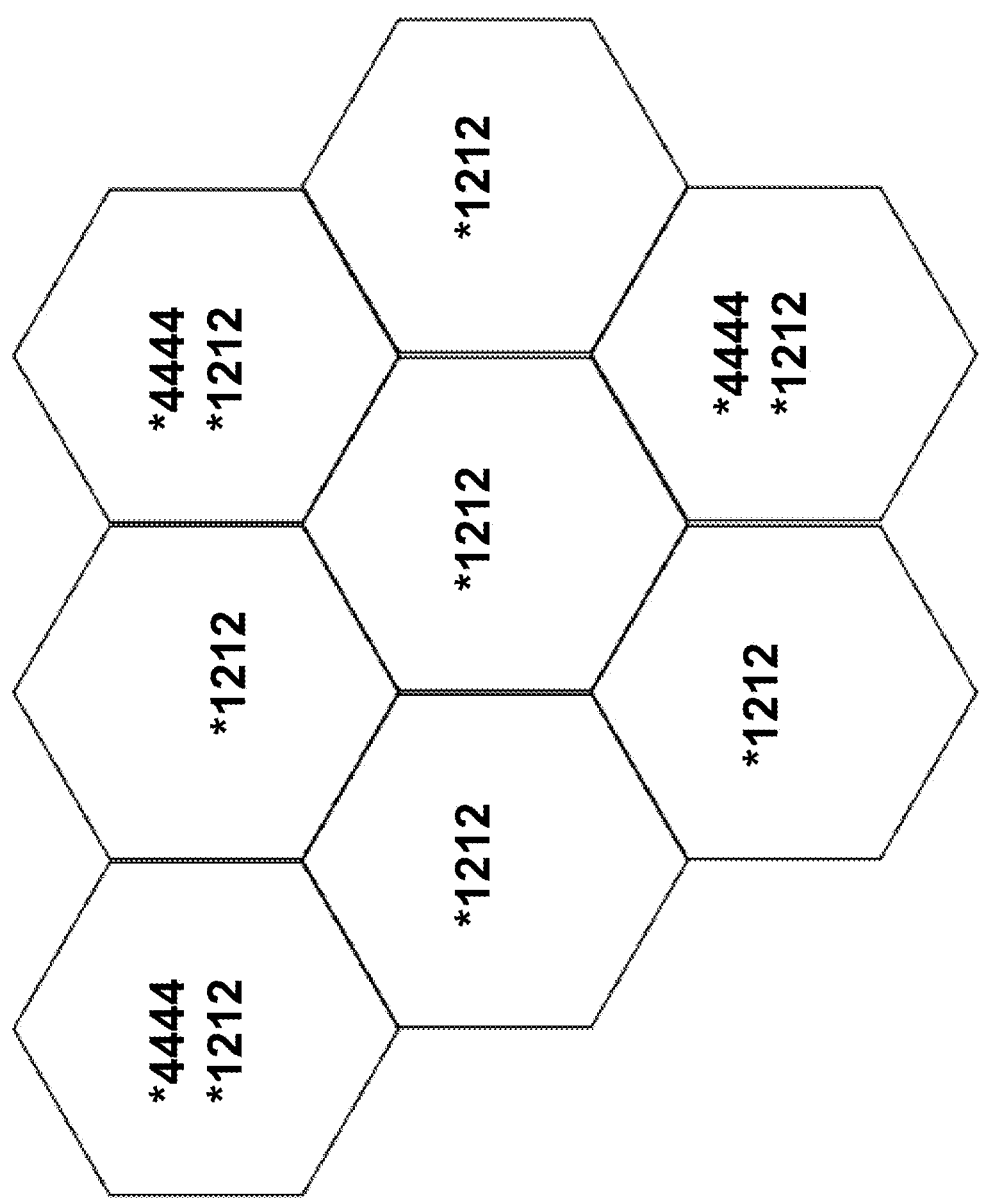
FIG. 11 illustrates an example schematic of the use of shortened numbers in adjacent geographic areas, in accordance with an embodiment of the present invention.

After the target numbers (e.g., shortened numbers and/or other target telephone numbers), call destinations, rules, and/or the like have been provided to the call management computing entity 100 (e.g., in communication with the mobile device 105), a mobile device 105 (e.g., executing an application initiation program), or any other entity or device placing an outbound call or receiving an inbound call can determine/identify whether the corresponding inbound or outbound number is one of a plurality of target numbers (Block 505 of FIG. 5). This may require that the user navigate one or more menus, dialogue boxes, prompts, screens, verbal commands, and/or the like to place the outbound call and/or receive an inbound call. In one embodiment, as a user dials a phone number via a mobile device 105 (e.g., executing an application initiation program) or otherwise initiates a call (Block 500 of FIG. 5), the mobile device 105 (e.g., executing an application initiation program) can determine/identify whether the dialed number is one of a plurality of target numbers listed in the database. Such an operation may be performed as the user types or once, for example, the user clicks, pushes, selects, and/or other words used herein interchangeably sends via the mobile device 105 (e.g., executing an application initiation program). To determine/identify whether the number is one of a plurality of target numbers, the mobile device 105 (e.g., executing an application initiation program) can access a local database to determine/identify whether a corresponding match exists.

In another embodiment, the mobile device 105 can transmit or originate the inbound or outbound number to the appropriate computing entity in communication with the mobile device 105 (e.g., management computing entity 100, mobile device communications network, callee device/entity, and/or the like) to make such determinations. In this embodiment, the appropriate computing entity in communication with the mobile device 105 (e.g., management computing entity 100, mobile device communications network, callee device/entity, and/or the like) can make such determinations and carry out the call control rules using a variety of signaling and notification approaches and techniques—including push notifications to a user application on the mobile device 105. A variety of other approaches and techniques can be used to adapt to various needs and circumstances. For instance, as will be recognized, the same can be applied to calls that are being received by the mobile device 105 (e.g., executing an application initiation program).

In one embodiment, if an inbound or outbound number is determined/identified by the appropriate computing entity to not be a target number, the mobile device 105 (e.g., executing an application initiation program) call allow the call to proceed with normal call operation (Block 510 of FIG. 5). Such normal call operation may include connecting (e.g., establishing) the call between the parties, for example. As will be recognized, a variety of other approaches and techniques can be used to adapt to various needs and circumstances.

In one embodiment, if the inbound or outbound number (e.g., an outbound shortened number) is determined/identified by the appropriate computing entity to be a target number, the appropriate computing entity (e.g., mobile device 105, management computing entity 100, caller/callee device/entity, and/or mobile device communications network) can execute the actions specified by the call control rules based on the current geographic location of the mobile device 105. The geographic location of the mobile device 105 can be determined/identified in a variety of ways and by a variety of computing entities (Block 515 of FIG. 5). The location of the of the mobile device 105 can be determined/identified by the appropriate computing entity (e.g., mobile device 105, management computing entity 100, caller/callee device/entity, and/or mobile device communications network) at a particular time with the aid of location-determining devices and techniques—such as location sensors, GPS, cellular assisted GPS, real time location system or server technology using received signal strength indicators from a Wi-Fi network, SIM, base station or cellular tower identifiers, other location determining/identifying features/aspects, visitor location registers, and/or the like. The geographic location of the mobile device 105 can be determined/identified at any point before, during, after, or simultaneous to the initiation of the call (e.g., the dialing of a shortened number and/or the like). The geographic location can also be determined/identified by a variety of appropriate computing entities.

3. Rule Identification and Execution

In one embodiment, after determining/identifying that an inbound or outbound number (e.g., a dialed shortened number) is a target number and identifying the geographic area associated with the mobile device 105 or within which the mobile device 105 is located, the appropriate computing entity (e.g., mobile device 105, management computing entity 100, caller/callee device/entity, and/or mobile device communications network) can identify the appropriate call control rules (Block 520 of FIG. 5). As will be recognized, the call control rules may define a variety of actions that are to be performed by the appropriate computing entity (e.g., mobile device 105, management computing entity 100, caller/callee device/entity, and/or mobile device communications network)—such as whether the call should be established, terminated/blocked, or suspended; whether and to what call destination (e.g., telephone number, online number, user ID (and application or service), URL, URI, and/or the like) the call should be redirected; whether the mobile device 105 (e.g., executing an application initiation program or other computing entity) should perform any other actions, such as opening a browser or a new tab in a browser to an identified URL or opening an identified application resident on the mobile device 105 (e.g., executing an application initiation program); and/or the like.

After identifying the appropriate call control rules, the appropriate computing entity (e.g., mobile device 105, management computing entity 100, caller/callee device/entity, and/or mobile device communications network) can execute the actions specified by the call control rules (Blocks 525 and 530 of FIG. 5). In one embodiment, the mobile device 105 can execute the actions independent of the call management computing entity 100 and/or the mobile device communications network. In another embodiment, the call management computing entity 100 and the mobile device communications network may make such determinations and provide instructions to the mobile device 105 to carry out and/or perform the same (including using push notifications to a user application resident on the mobile device 105). In another embodiment, the callee device/entity may make such determinations and provide instructions to the mobile device 105 to carry out and/or perform the same (including using push notifications to a user application resident on the mobile device 105)

As noted above, in various embodiments, the call control rules may indicate that the action to be performed may be carried out via a web-based destination (e.g., a URL, URI, Internet accessible, an Internet enabled mobile app, and/or the like) or a telephone network destination (e.g., via one or more PSTNs and/or the like). In one embodiment, the call control rules may indicate that if a mobile device 105 is in communication with a Wi-Fi network but is not in communication with a mobile device communications network (e.g., the mobile device is connected to a local Wi-Fi network but does not have cell service), that a web-based destination is to be used. Similarly, in one embodiment, if the mobile device is not in communication with a Wi-Fi or broadband network but is in communication with a mobile device communications network (e.g., the mobile device is not connected to a Wi-Fi or broadband network but does have cell service), a telephone network destination is to be used.

In one embodiment, if the call destination is a web-based destination (e.g., a URL, URI, Internet accessible, an Internet enabled mobile app, and/or the like) based on the call control rules, the web-based rules may be executed instead of completing the telephone call (Block 525 of FIG. 5). For instance, in the above examples, call control rules exist for the telephone numbers associated with Samsung, Delta, and Dish. The call control rules for Samsung define that all calls to or received from 1-888-987-4357 between 19:00-07:00 Eastern Standard Time should be not allowed (e.g., should be terminated/blocked), and instead, an Internet browser on the corresponding mobile device 105 should be initiated and opened to http://www.samsung.com/us/support/contact (see FIG. 6). This true for all calls made or received anywhere in the world. The Delta rules define that calls to 1-404-773-0305 (from the mobile device 105) or received from 1-404-773-0305 (by the mobile device 105) for the first time and the mobile device 105 being associated with or physically located in the state of Georgia in the United States should be terminated/blocked, and instead, an Internet browser on the corresponding mobile device 105 should be initiated and opened to http://www.delta.com/content/www/support (see FIG. 7). The Dish rules define that calls to or received from 1-800-823-4929 (regardless of the users' locations) should always be allowed (e.g., established) and a chat session for all calls should be opened in a browser during the call to https://dishnetwork.custhelp.com/app/chat (see FIG. 8). The chat may be via an Internet browser or Dish application, for instance.

In an embodiment in which a browser or application is initiated, the browser or application may be positioned in a variety of ways with regard to the dialer/caller/user of the mobile device 105, such as via a split screen, shared screen, overlapping screens, cascading screens, a superimposed screen, and/or simply show each screen individually in the same window simultaneously. In one embodiment, the browser or application that is initiated may also control (e.g., take over) some of the call functionality. For example, the browser or application that is initiated may be used to present a dialer interface through which the user of the mobile device 105 can interact to control the call (see FIG. 10).

In one embodiment, if the call destination is a voice and/or video destination (e.g., accessible via a PSTN, VOIP, other video and/or voice communication, and/or the like) based on the call control rules, the call control rules may be executed by the appropriate entities (Block 530 of FIG. 5). For example, in an embodiment in which the target number (e.g., shorted number or other target number) is to be redirected to a different call destination, the appropriate computing entity (e.g., mobile device 105, management computing entity 100, caller/callee device/entity, and/or mobile device communications network) can redirect the call in accordance with the call control rules. The call can then proceed with normal call operation to the call destination (e.g., telephone number, online number, user ID (and application or service), and/or the like). Such normal call operation may include connecting (e.g., establishing) the call between the parties, for example.

Or, in other embodiments, the appropriate computing entity (e.g., mobile device 105, management computing entity 100, caller/callee device/entity, and/or mobile device communications network) can initiate an application (e.g., browser or application) to be opened, activated, initiated, and/or the like. In a remote embodiment, an appropriate computing entity can carry this out through a push notification/instruction to the mobile device 105. In such a case, the browser or application may be positioned in a variety of ways with regard to the dialer of the mobile device 105, such as via a split screen, shared screen, overlapping screens, cascading screens, a superimposed screen, and/or simply show each screen individually in the same window simultaneously. In one embodiment, the browser or application that is initiated may also control (e.g., take over) some of the call functionality. For example, the browser or application that is initiated may be used to present a dialer interface through which the user of the mobile device 105 can interact to control the call.

For example, in one embodiment, a browser or application may be initiated to accept selections by the user of the mobile device 105 and to provide instructions or commands that can be used or executed by the dialer of the mobile device 105 (or other applications). For example, as described above, the mobile device 105 (e.g., executing an application initiation program) can launch a browser or application (menu, dialogue box, window, and/or the like) before, simultaneous to, or during a call to a target number. In one embodiment, the browser or application may direct the user of the mobile device 105 (e.g., executing an application initiation program) to an interface with information about the parties who have extensions at or who can be reached through the target number (see FIG. 9). For example, the browser or application may provide information that indicates that to speak with Chris, the user of the mobile device 105 (e.g., executing an application initiation program) only needs to select the image of Chris—and likewise for Michelle and Pat. In response to receiving input of the user's selection via the mobile device 105 (e.g., executing an application initiation program), the mobile device 105 can provide the dialer (e.g., using DTMF and/or a variety of other technologies, for example) with the appropriate extension (e.g., extension 106) and automatically dial or input the same for the user. This may or may not involve corresponding communications with the call management computing entity 100 or a third party computing entity 100. In various embodiments, such features may also be employed to allow users to bypass or navigate one or more prompts of Interactive voice response (IVR) systems, for example. For instance, the browser or application can provide a visual menu for selecting different call options (e.g., companies, departments, people, and/or the like) to dial extensions, navigate IVR systems and menus, and/or the like.

In another example, the browser or application that is initiated may be used to provide contextual information to a call. For instance, a call intercepted as outgoing to the Delta telephone number can be used to provide the user with a visual menu for selecting different call options and also provide the user with information regarding his or her position in the call queue; an expected wait time; providing options to continue, hang up, schedule, or delay the call (see FIG. 10); and/or the like (see FIG. 10). In one embodiment, if the user (e.g., operating an appropriate device/entity) closes the browser or selects hang up, the user may lose his or her place in queue and the call may be disconnected. Further, delaying and scheduling such calls is described in greater detail in U.S. Pat. No. 8,243,724, which is incorporated herein by reference in its entirety.

In one embodiment, via the browser, third parties, for example, can provide or offer coupons, incentives, offers, advertisements, and/or the like. The user can accept, reject/deny, schedule, or delay the calls for such coupons, incentives, offers, advertisements, and/or the like. As will be recognized, a variety of different approaches and techniques can be used to adapt to various needs and circumstances.

4. Shortened Numbers in Adjacent Geographic Areas

In one embodiment, to avoid issues with adjacent geographic areas using the same shortened numbers, the architecture may be implemented such that adjacent geographic areas cannot use duplicate shortened numbers. For example, FIG. 11 does not show the shortened number of *4444 as being present in adjacent geographic areas. This will allow for various entities to use the same shortened number as long as the geographic areas are not adjacent and/or do not overlap. However, in another embodiment, shortened numbers can be used in adjacent geographic areas provided the shortened numbers are associated with the same entity in each geographic area, are to be redirected to the same call destination, and/or are associated with the same call control rules. As will be recognized, a variety of other approaches and techniques can be used to adapt to various needs and circumstances.

5. Third Party Can Cause Trigger Actions

In one embodiment, in addition to the call management computing entity 100 (e.g., in communication with the mobile device 105) providing instructions to the mobile device 105 (e.g., executing an application initiation program) to carry out and/or perform certain actions and making the corresponding determinations/identifications, various other computing entities (e.g., the third party computing entity 120, caller/callee devices/entities, mobile device communications networks, and/or the like) can also provide such instructions to mobile devices 105 (e.g., executing application initiation programs). For example, before, simultaneous to, during, and/or after calling a telephone number associated with a mobile device 105, the third party computing entity 120 (and/or various other computing entities) can provide instructions to the user's mobile device 105 (e.g., executing an application initiation program) to initiate a browser or other application. For example, assume a user calls Delta using his mobile device 105 (e.g., executing an application initiation program). During the call, a Delta representative may want to provide the user (e.g., operating a mobile device 105) with a mechanism to review flight details and/or pay for the flight. To do so, the third party (e.g., operating a third party computing entity 120) may provide such instructions to the mobile device 105 (e.g., executing an application initiation program) for carrying out the same. As will be recognized, the third party computing entity 120 and/or call management computing entity 100 (e.g., in communication with the mobile device 105) can provide instructions to such mobile devices 105 (e.g., executing an application initiation program) to carry out and/or perform a variety of actions before, simultaneous to, during, and/or after calling a telephone number and/or shortened number. As will be recognized, a variety of other approaches and techniques can be used to adapt to various needs and circumstances.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for call control, the method comprising:
    determining whether an outbound number for an outbound call of a mobile device is one of a plurality of target numbers;
    responsive to determining that the outbound number is one of a plurality of target numbers, identifying (a) one or more call control rules associated with the outbound number and (b) a geographic area of the mobile device;
    responsive to identifying (a) the one or more call control rules associated with the outbound number and (b) the geographic area of the mobile device, identifying one or more geographic areas adjacent to the geographic area of the mobile device; and
    responsive to identifying one or more geographic areas adjacent to the geographic area of the mobile device, identifying one or more actions to be carried out in accordance with the one or more call control rules, wherein the one or more call control rules are based at least in part on (a) the geographic area of the mobile device, and (b) the one or more geographic areas adjacent to the geographic area of the mobile device,
    further comprising, responsive to determining that the outbound number is not one of the plurality of target numbers, allowing the outbound number to follow normal call operation.

2. The method of claim 1 wherein the outbound number is a shortened number.

3. The method of claim 1 wherein the call control rules are based at least in part on at least one of a calendar date on which the outbound number is received, a time of day at which the outbound number is received, previous calls to the outbound number via the mobile device, one or more networks with which the mobile device is in communication therewith.

4. The method of claim 1 wherein the call control rules indicate that at least one of the one or more actions to be carried out pertains to a web-based call destination.

5. The method of claim 1 wherein the call control rules indicate that at least one of the one or more actions to be carried out pertains to a telephone network destination.

6. The method of claim 1, wherein at least one of the one or more actions comprises initiating an application to be displayed via the mobile device.

7. The method of claim 1 further comprising carrying out the one or more actions in accordance with the one or more call control rules.

8. An apparatus comprising at least one processor and at least one memory including program code, the at least one memory and the program code configured to, with the processor, cause the apparatus to at least:
    determine whether an outbound number of an apparatus is one of a plurality of target numbers;
    responsive to determining that the outbound number is one of the plurality of target numbers, identify (a) one or more call control rules associated with the outbound number and (b) a geographic area of the mobile device;
    responsive to identifying (a) the one or more call control rules associated with the outbound number and (b) the geographic area of the mobile device, identify one or more geographic areas adjacent to the geographic area of the mobile device; and
    responsive to identifying the one or more geographic areas adjacent to the geographic area of the mobile device, identify one or more actions to be carried out in accordance with the one or more call control rules, wherein the one or more call control rules are based at least in part on (a) the geographic area of the mobile device, and (b) the one or more geographic areas adjacent to the geographic area of the mobile device,
    wherein the at least one memory and the program code are further configured to, with the processor, cause the apparatus to, responsive to determining that the outbound number is not one of the plurality of target numbers, allowing the outbound number to follow normal call operation.

9. The apparatus of claim 8 wherein the outbound number is a shortened number.

10. The apparatus of claim 8 wherein the call control rules are based at least in part on at least one of a calendar date on which the outbound number is received, a time of day at which the outbound number is received, previous calls to the outbound number via the apparatus, one or more networks with which the apparatus is in communication therewith.

11. The apparatus of claim 8 wherein the call control rules indicate that at least one of the one or more actions to be carried out pertains to a web-based call destination.

12. The apparatus of claim 8 wherein the call control rules indicate that at least one of the one or more actions to be carried out pertains to a telephone network destination.

13. The apparatus of claim 8, wherein at least one of the one or more actions comprises initiating an application to be displayed via the apparatus.

14. The apparatus of claim 8 wherein the at least one memory and the program code are further configured to, with the processor, cause the apparatus to, carry out the one or more actions in accordance with the one or more call control rules.

15. A computer program product comprising at least one non-transitory computer-readable storage medium having computer-readable program code portions stored therein, the computer-readable program code portions comprising:
    an executable portion configured to determine whether an outbound number of a mobile device is one of a plurality of target numbers;
    an executable portion configured to, responsive to determining that the outbound number is one of the plurality of target numbers, identify (a) one or more call control rules associated with the outbound number and (b) a geographic area of the mobile device;
    an executable portion configured to, responsive to identifying (a) the one or more call control rules associated with the outbound number and (b) the geographic area of the mobile device, identify one or more geographic areas adjacent to the geographic area of the mobile device; and
    an executable portion configured to, responsive to identifying the one or more geographic areas adjacent to the geographic area of the mobile device, identify one or more actions to be carried out in accordance with the one or more call control rules, wherein the one or more call control rules are based at least in part on (a) the geographic area of the mobile device, and (b) the one or more geographic areas adjacent to the geographic area of the mobile device,
    further comprising an executable portion configured to, responsive to determining that the outbound number is not one of the plurality of target numbers, allowing the outbound number to follow normal call operation.

16. The computer program product of claim 15 wherein the outbound number is a shortened number.

17. The computer program product of claim 15, wherein at least one of the one or more actions comprises initiating an application to be displayed via the mobile device.

18. The computer program product of claim 15 further comprising an executable portion configured to carry out the one or more actions in accordance with the one or more call control rules.

\* \* \* \* \*